US012381490B2

(12) United States Patent
Shindo et al.

(10) Patent No.: US 12,381,490 B2
(45) Date of Patent: Aug. 5, 2025

(54) ELECTRIC POWER CONVERSION DEVICE

(71) Applicant: HONDA MOTOR CO., LTD., Tokyo (JP)

(72) Inventors: Yusuke Shindo, Wako (JP); Jun Kato, Wako (JP); Takahiro Hagimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 348 days.

(21) Appl. No.: 18/125,149

(22) Filed: Mar. 23, 2023

(65) Prior Publication Data
US 2023/0318477 A1    Oct. 5, 2023

(30) Foreign Application Priority Data

Mar. 31, 2022   (JP) ................. 2022-058646

(51) Int. Cl.
   *H02M 7/00*      (2006.01)
   *H02M 7/5387*    (2007.01)
(52) U.S. Cl.
   CPC ........ *H02M 7/003* (2013.01); *H02M 7/5387* (2013.01)
(58) Field of Classification Search
   None
   See application file for complete search history.

(56) References Cited

U.S. PATENT DOCUMENTS

| 2014/0233204 A1* | 8/2014 | Tokuyama | H05K 7/02 |
| | | | 361/820 |
| 2014/0284765 A1* | 9/2014 | Kiuchi | H01L 23/473 |
| | | | 257/532 |
| 2015/0222195 A1* | 8/2015 | Tachibana | H05K 7/20272 |
| | | | 361/699 |
| 2019/0181128 A1* | 6/2019 | Anzai | H01L 25/07 |
| 2019/0252993 A1* | 8/2019 | Uneme | H02M 3/158 |

(Continued)

FOREIGN PATENT DOCUMENTS

| JP | 2008-118774 | 5/2008 |
| JP | 2013-027232 | 2/2013 |

(Continued)

OTHER PUBLICATIONS

Japanese Notice Of Allowance for Japanese Patent Application No. 2022-058646 mailed Jan. 30, 2024.

*Primary Examiner* — Xanthia C Relford
(74) *Attorney, Agent, or Firm* — Amin, Turocy & Watson, LLP

(57) ABSTRACT

An electric power conversion device of an embodiment includes: a primary side negative electrode terminal; a secondary side negative electrode terminal; a negative electrode terminal of a switching element connected between the primary side negative electrode terminal and the secondary side negative electrode terminal; a first conductive member connected to the primary side negative electrode terminal; a second conductive member connected to the negative electrode terminal of the switching element; and a third conductive member connected to the secondary side negative electrode terminal, wherein the first conductive member, the second conductive member, and the third conductive member are connected to one another, and the first conductive member is formed as a separate body separately from the second conductive member and the third conductive member.

9 Claims, 10 Drawing Sheets

(56) References Cited

U.S. PATENT DOCUMENTS

| | | | | |
|---|---|---|---|---|
| 2020/0118753 A1* | 4/2020 | Nishimura | ............... | H01G 4/33 |
| 2020/0382014 A1* | 12/2020 | Abe | .................... | H02M 7/5387 |
| 2021/0006177 A1* | 1/2021 | Uneme | ................. | H02M 7/003 |
| 2021/0218326 A1* | 7/2021 | Kaneko | .................... | H02M 1/32 |
| 2021/0225724 A1* | 7/2021 | Satou | ...................... | H02M 1/32 |

FOREIGN PATENT DOCUMENTS

| | | |
|---|---|---|
| JP | 2017-216803 | 12/2017 |
| JP | 2019-201531 | 11/2019 |
| JP | 2021-170879 | 10/2021 |

\* cited by examiner

ELECTRIC POWER CONVERSION DEVICE

CROSS-REFERENCE TO RELATED APPLICATION

Priority is claimed on Japanese Patent Application No. 2022-058646, filed on Mar. 31, 2022, the contents of which are incorporated herein by reference.

BACKGROUND

Field of the Invention

The present invention relates to an electric power conversion device.

Background

In the related art, an electric power conversion device is known which includes a primary side negative electrode terminal, a secondary side negative electrode terminal, and a negative electrode terminal of a switching element connected between the primary side negative electrode terminal and the secondary side negative electrode terminal (for example, refer to Japanese Unexamined Patent Application, First Publication No. 2019-201531). The electric power conversion device includes a branched negative electrode bus bar for connecting the primary side negative electrode terminal to the secondary side negative electrode terminal and the negative electrode terminal of the switching element.

SUMMARY

Depending on a portion where the negative electrode bus bar is fastened, there may be cases in which a line length of a bus bar on the primary side is longer than a line length of a bus bar on the secondary side. When the line length of a line through which the largest current (a primary side current) flows in the electric power conversion device is lengthened, a problem of an increase in loss occurs.

An object of an aspect of the present invention is to provide an electric power conversion device capable of preventing an increase in loss.

An electric power conversion device according to a first aspect of the present invention includes: a primary side negative electrode terminal; a secondary side negative electrode terminal; a negative electrode terminal of a switching element connected between the primary side negative electrode terminal and the secondary side negative electrode terminal; a first conductive member connected to the primary side negative electrode terminal; a second conductive member connected to the negative electrode terminal of the switching element; and a third conductive member connected to the secondary side negative electrode terminal, wherein the first conductive member, the second conductive member, and the third conductive member are connected to one another, and the first conductive member is formed as a separate body separately from the second conductive member and the third conductive member.

In a second aspect of the present invention, the second conductive member and the third conductive member may be formed as a separate body separately from each other.

In a third aspect of the present invention, a cross-sectional area perpendicular to a current path direction of the second conductive member may be smaller than a cross-sectional area perpendicular to a current path direction of the first conductive member.

In a fourth aspect of the present invention, a cross-sectional area perpendicular to a current path direction of the third conductive member may be smaller than a cross-sectional area perpendicular to a current path direction of the first conductive member.

In a fifth aspect of the present invention, a portion at which the first conductive member is connected to at least one of the second conductive member and the third conductive member may be arranged closer to the primary side negative electrode terminal than the secondary side negative electrode terminal.

In a sixth aspect of the present invention, at least part of the first conductive member, the second conductive member, and the third conductive member may intersect on planes different from each other.

According to the first aspect described above, the electric power conversion device includes: the primary side negative electrode terminal; the secondary side negative electrode terminal; the negative electrode terminal of the switching element connected between the primary side negative electrode terminal and the secondary side negative electrode terminal; the first conductive member connected to the primary side negative electrode terminal; the second conductive member connected to the negative electrode terminal of the switching element; and the third conductive member connected to the secondary side negative electrode terminal, wherein the first conductive member, the second conductive member, and the third conductive member are connected to one another, and the first conductive member is formed as a separate body separately from the second conductive member and the third conductive member, and thereby, the following effects are achieved.

The first conductive member is formed as a separate body separately from the second conductive member and the third conductive member, and thereby, it is possible to shorten the line length of the first conductive member regardless of the line lengths of the second conductive member and the third conductive member. Therefore, it is possible to shorten the line length of a line through which the largest current (a primary side current) flows in the electric power conversion device. Accordingly, it is possible to prevent the increase in loss. Additionally, cooling can be facilitated compared to the case in which the first conductive member is formed integrally with the second conductive member and the third conductive member.

According to the second aspect described above, the second conductive member and the third conductive member are formed as separate bodies from each other, and thereby, the following effects are achieved.

Cooling can be facilitated compared to the case in which the second conductive member and the third conductive member are formed integrally with each other.

According to the third aspect described above, the cross-sectional area perpendicular to the current path direction of the second conductive member is smaller than the cross-sectional area perpendicular to the current path direction of the first conductive member, and thereby, the following effects are achieved.

By thinning the second conductive member more than the first conductive member, the weight can be reduced.

According to the fourth aspect described above, the cross-sectional area perpendicular to the current path direction of the third conductive member is smaller than the cross-sectional area perpendicular to the current path direction of the first conductive member, and thereby, the following effects are achieved.

By thinning the third conductive member more than the first conductive member, the weight can be reduced.

According to the fifth aspect described above, the portion at which the first conductive member is connected to at least one of the second conductive member and the third conductive member is arranged closer to the primary side negative electrode terminal than the secondary side negative electrode terminal, and thereby, the following effects are achieved.

Compared to the case where the portion at which the first conductive member is connected to at least one of the second conductive member and the third conductive member is arranged closer to the secondary side negative electrode terminal than the primary side negative electrode terminal, it is possible to shorten the line length of a line through which a large current (a primary side current) flows in the first conductive member. Accordingly, it is possible to prevent the increase in loss.

According to the sixth aspect described above, at least part of the first conductive member, the second conductive member, and the third conductive member intersect on planes different from each other, and thereby, the following effects are achieved.

Since at least part of the first conductive member, the second conductive member, and the third conductive member spatially intersect one another and are thereby arranged compactly, miniaturization can be achieved.

DESCRIPTION OF EMBODIMENTS

Hereinafter, embodiments of the present invention will be described with reference to the drawings. The embodiments are described using an example of an electric power conversion device mounted on a vehicle.

<Vehicle>

Figure 1:
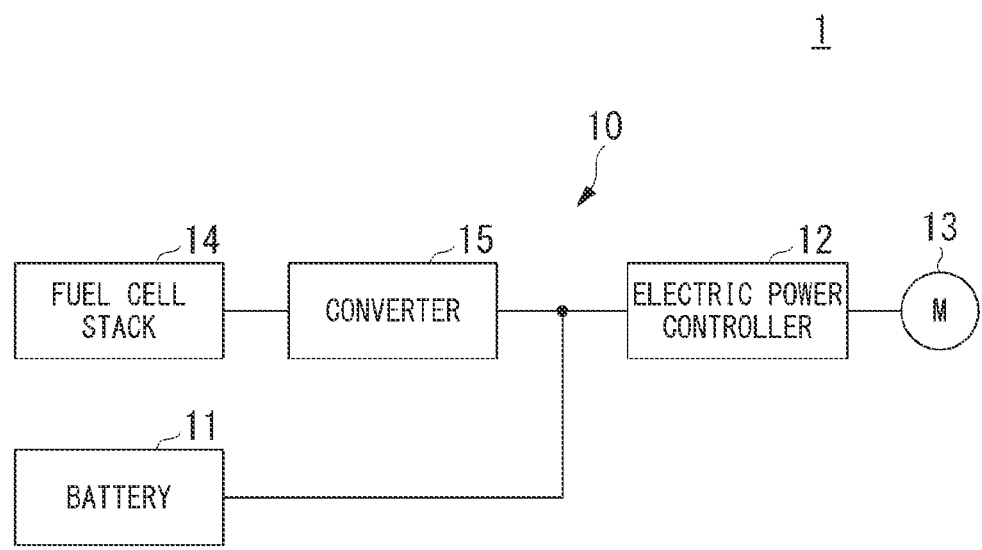
FIG. 1 is a block diagram showing part of a functional configuration of a vehicle that includes an electric power conversion device of an embodiment.

FIG. 1 is a block diagram showing part of a functional configuration of a vehicle that includes an electric power conversion device of an embodiment.

As shown in FIG. 1, an electric power conversion device 10 is mounted on a vehicle 1 such as an electric vehicle. For example, the electric vehicle is an electric automobile, a hybrid automobile, a fuel cell automobile, and the like. The electric automobile is driven using a battery as a power source. The hybrid automobile is driven using a battery and an internal combustion engine as a power source. The fuel cell automobile is driven using a fuel cell as a power source.

In the example of FIG. 1, the vehicle 1 is a fuel cell automobile. The vehicle 1 includes a battery 11, an electric power controller 12 (PCU: Power Control Unit), a rotating electric machine 13, a fuel cell stack 14 (FCS: Fuel Cell Stack), and a converter 15. The electric power conversion device 10 of the embodiment includes the converter (FC converter).

For example, the battery 11 is a high-voltage battery that serves as a power source of the vehicle. The battery 11 includes a battery case and a plurality of battery modules accommodated in the battery case. The battery module includes a plurality of battery cells connected in series or in parallel. A positive electrode terminal and a negative electrode terminal of the battery are connected to the electric power controller 12 and the converter 15.

For example, the electric power controller 12 includes an inverter or the like that performs electric power conversion between direct current and alternating current. For example, the electric power controller 12 includes a bridge circuit formed of a plurality of switching elements and rectifying elements connected by a bridge connection in three phases. The electric power controller 12 controls an operation of the rotating electric machine by transmitting and receiving electric power.

For example, when the rotating electric machine 13 is powered, the electric power controller 12 converts a DC current input from the positive electrode terminal and the negative electrode terminal into a three-phase AC current and thereby supplies the three-phase AC current to the rotating electric machine from a three-phase AC terminal. The electric power controller 12 generates a rotational driving force by sequentially commutating energization of three-phase stator windings of the rotating electric machine 13.

For example, at the time of regeneration of the rotating electric machine 13, the electric power controller 12 converts three-phase AC electric power input from the three-phase AC terminal into DC electric power by the driving of turning-on (conduction) and turning-off (cutoff) of a switching element of each phase synchronized with the rotation of the rotating electric machine 13. The electric power controller 12 can supply a DC current converted from the three-phase AC electric power to the battery 11.

For example, the rotating electric machine 13 is a three-phase AC brushless DC motor. The rotating electric machine 13 includes a rotor having a permanent magnet for a magnetic field, and a stator having three-phase stator windings which generate a rotating magnetic field that rotates the rotor. The three-phase stator windings are connected to an AC terminal of the electric power controller 12.

For example, the rotating electric machine 13 is for driving the vehicle 1 and generates a rotational driving force by performing a power running operation with electric power supplied from the electric power controller 12. For example, when the rotating electric machine 13 can be connected to a wheel of the vehicle 1, the rotating electric machine 13 generates a driving force by performing a power running operation with electric power supplied from the electric power controller 12.

The rotating electric machine 13 may generate electric power by performing a regenerative operation with rotational power input from the wheel side of the vehicle 1. When the rotating electric machine 13 can be connected to an internal combustion engine of the vehicle 1, the rotating electric machine 13 may generate electric power using power of the internal combustion engine.

For example, the fuel cell stack 14 is a solid polymer fuel cell. The solid polymer fuel cell includes a plurality of stacked fuel cells and a pair of end plates that sandwich a laminated body of the plurality of fuel cells. The fuel cell includes an electrolyte electrode structure and a pair of separators that sandwich the electrolyte electrode structure. The electrolyte electrode structure includes a solid polymer electrolyte membrane, and a fuel electrode and an oxygen electrode that sandwich the solid polymer electrolyte membrane. The solid polymer electrolyte membrane includes a cation exchange membrane and the like. The fuel electrode (an anode) includes an anode catalyst, a gas diffusion layer, and the like. The oxygen electrode (a cathode) includes a cathode catalyst, a gas diffusion layer, and the like.

The fuel cell stack 14 generates electric power through a reaction between a fuel gas supplied from a fuel tank to the anode and an oxidant gas such as air containing oxygen supplied from an air pump to the cathode.

A positive electrode terminal and a negative electrode terminal of the fuel cell stack 14 are connected to the converter 15.

<Electric Power Conversion Device>

Figure 2:
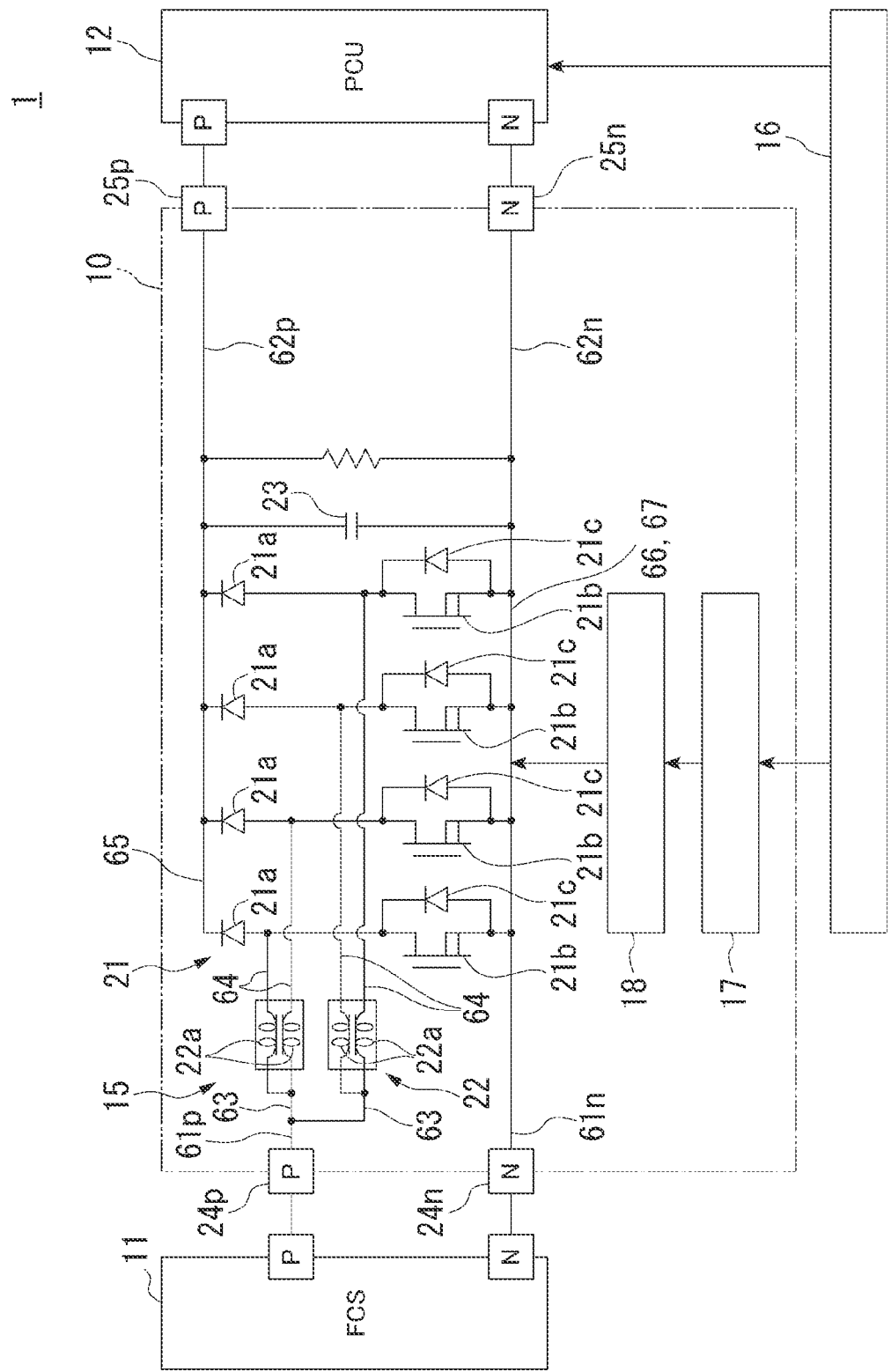
FIG. 2 is a view showing part of a configuration of the vehicle that includes the electric power conversion device of the embodiment.
Figure 3:
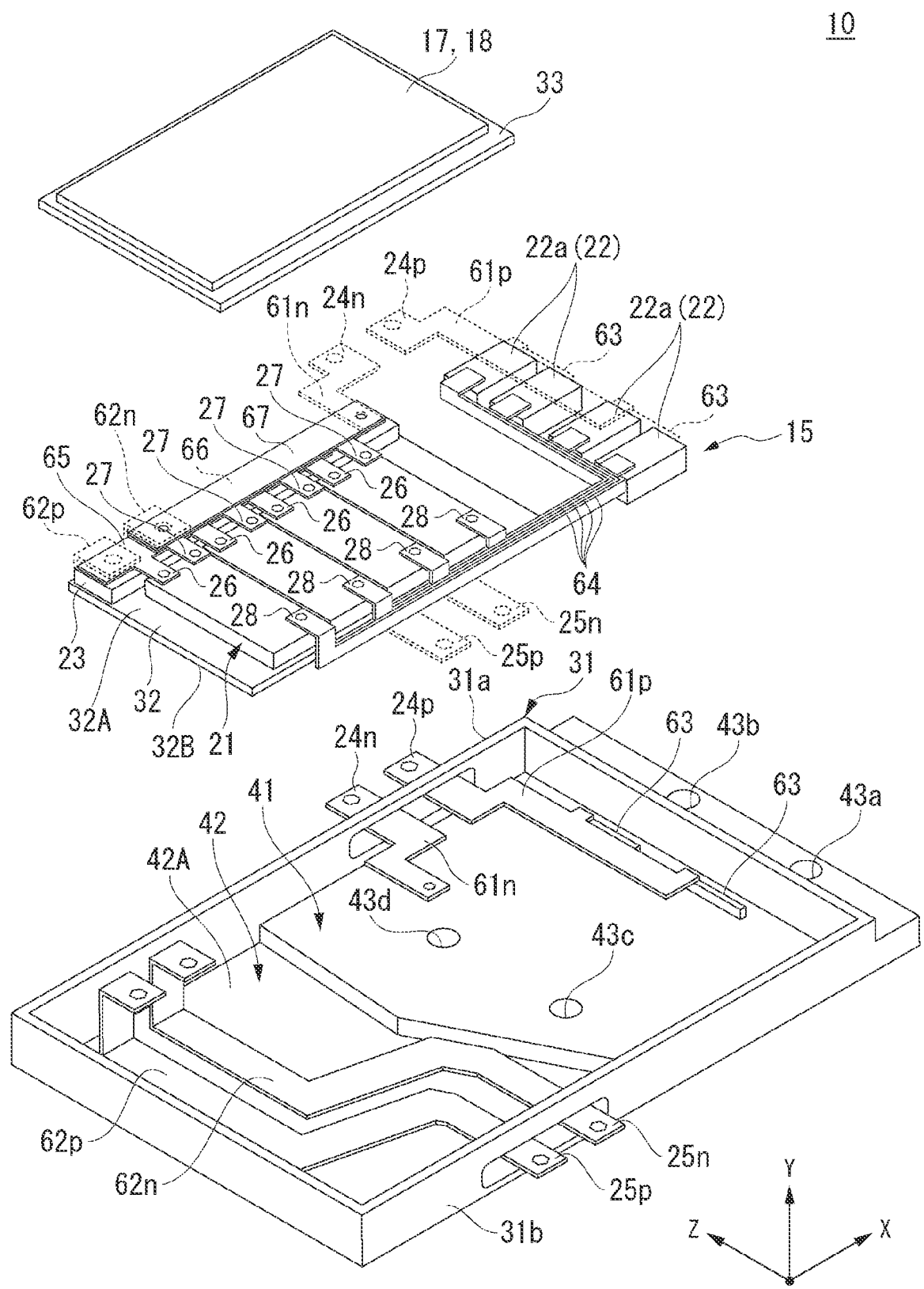
FIG. 3 is an exploded perspective view of the electric power conversion device of the embodiment.

FIG. 2 is a view showing part of a configuration of the vehicle that includes the electric power conversion device of the embodiment. FIG. 3 is an exploded perspective view of the electric power conversion device of the embodiment.

As shown in FIG. 2 and FIG. 3, the electric power conversion device 10 includes the converter 15, an electronic control unit 17, and a gate drive unit 18. The vehicle 1 includes the electric power controller 12 and a control device 16 that controls the electronic control unit 17.

For example, the converter 15 includes a DC-DC converter or the like that performs electric power conversion such as boosting. The converter 15 includes an element module 21 formed of a plurality of switching elements and rectifying elements connected by a bridge connection in four phases, two composite reactors 22, and a condenser (a capacitor) 23. The converter 15 boosts electric power input from the fuel cell stack 14 to a primary side positive electrode terminal 24p and a primary side negative electrode terminal 24n and thereby outputs electric power after the boosting from a secondary side positive electrode terminal 25p and a secondary side negative electrode terminal 25n.

For example, each phase of the element module 21 of the converter 15 includes a high-side arm diode 21a, a low-side arm transistor 21b, and a low-side arm reflux diode 21c. A cathode of the high-side arm diode 21a is connected to the secondary side positive electrode terminal 25p via a first terminal 26, a positive electrode bus bar 65, and a secondary side positive electrode bus bar 62p. An emitter of the low-side arm transistor 21b is connected to the primary side negative electrode terminal 24n via a second terminal 27 (a negative electrode terminal of the switching element), a negative electrode bus bar 66 (second conductive member), and a primary side negative electrode bus bar 61n (first conductive member). The emitter of the low-side arm transistor 21b is connected to the secondary side negative electrode terminal 25n via the second terminal 27, the negative electrode bus bar 66 (second conductive member), a negative electrode bus bar 67 (a third conductive member), and a secondary side negative electrode bus bar 62n. An anode of the high-side arm diode 21a is connected to a collector of the low-side arm transistor 21b. The low-side arm reflux diode 21c is connected in parallel in a forward direction from the emitter to the collector between the collector and the emitter of the transistor 21b.

For example, a composite reactor 22 includes two-phase coils 22a magnetically coupled with opposite polarities to each other. A first end portion of the coil 22a of each phase is connected to the primary side positive electrode terminal 24p via a primary side positive electrode bus bar 61p and a first bus bar 63. A second end portion of the coil 22a of each phase is connected to the anode of the high-side arm diode 21a and the collector of the low-side arm transistor 21b at each phase of the element module 21 via a third terminal 28 and a second bus bar 64.

For example, the condenser 23 is a capacitor that smooths a voltage fluctuation which occurs in association with a switching operation between turning-on (conduction) and turning-off (cutoff) of each transistor 21b. The positive electrode terminal and the negative electrode terminal of the condenser 23 are connected to the secondary side positive electrode terminal 25p and the secondary side negative electrode terminal 25n via the positive electrode bus bars 62p, 65 and the negative electrode bus bars 62n, 67. The negative electrode terminal of the condenser 23 is connected to the primary side negative electrode terminal 24n via the primary side negative electrode bus bar 61n.

The converter 15 switches between turning-on (conduction) and turning-off (cutoff) of each transistor 21b on the basis of a gate signal which is a switching command input from the gate drive unit 18 to the gate of the transistor 21b of each phase. The converter 15 boosts the electric power input from the primary side positive electrode terminal 24p and the primary side negative electrode terminal 24n caused by electric power generation of the fuel cell stack 14 and thereby outputs electric power after the boosting from the secondary side positive electrode terminal 25p and the secondary side negative electrode terminal 25n. The converter 15 accumulates magnetic energy by DC excitation of the composite reactor 22 at the time of turning-on (conduction) of each transistor 21b. The converter 15 generates a higher voltage at the secondary side positive electrode terminal 25p and the secondary side negative electrode terminal 25n than at the primary side positive electrode terminal 24p and the primary side negative electrode terminal 24n by superposition of an induced voltage generated by the magnetic energy of the composite reactor 22 at the time of turning-off (cutoff) of each transistor 21b and a voltage applied to the primary side positive electrode terminal 24p and the primary side negative electrode terminal 24n.

The electronic control unit 17 controls power conversion such as boosting of the converter 15. For example, the electronic control unit 17 is a software functional part that functions by a predetermined program being executed by a processor such as a CPU (Central Processing Unit). The software functional part is an ECU (Electronic Control Unit) that includes a processor such as a CPU, a ROM (Read-Only Memory) which stores a program, a RAM (Random-Access Memory) which temporarily stores data, and an electronic circuit such as a timer. At least part of the electronic control unit 17 may be an integrated circuit such as a LSI (Large-Scale Integration).

For example, the electronic control unit 17 generates a control signal input to the gate drive unit 18 by using a current target value in accordance with a boosting voltage command at the time of boosting of the converter 15. The control signal is a signal that indicates a timing of driving each transistor 21b of the converter 15 to be turned on (conduction) and off (cutoff).

For example, the electronic control unit 17 drives each transistor 21b of the element module 21 by so-called two-phase interleaving with respect to each of two composite reactors 22. The electronic control unit 17 shifts one cycle of switching control of a first phase transistor 21b by half a cycle from one cycle of switching control of a second phase transistor 21b in the two (two-phase) transistors 21b connected to each of the composite reactors 22.

The gate drive unit 18 generates a gate signal for driving each transistor 21b of the converter 15 to be turned on (conduction) and off (cutoff) on the basis of the control signal received from the electronic control unit 17. For example, the gate drive unit 18 performs amplification, level shifting, and the like of the control signal and generates the gate signal. For example, the gate drive unit 18 generates a gate signal having a duty ratio corresponding to a boosting voltage command at the time of boosting of the converter 15. For example, the duty ratio is a ratio of ON time of each transistor 21b.

Figure 4:
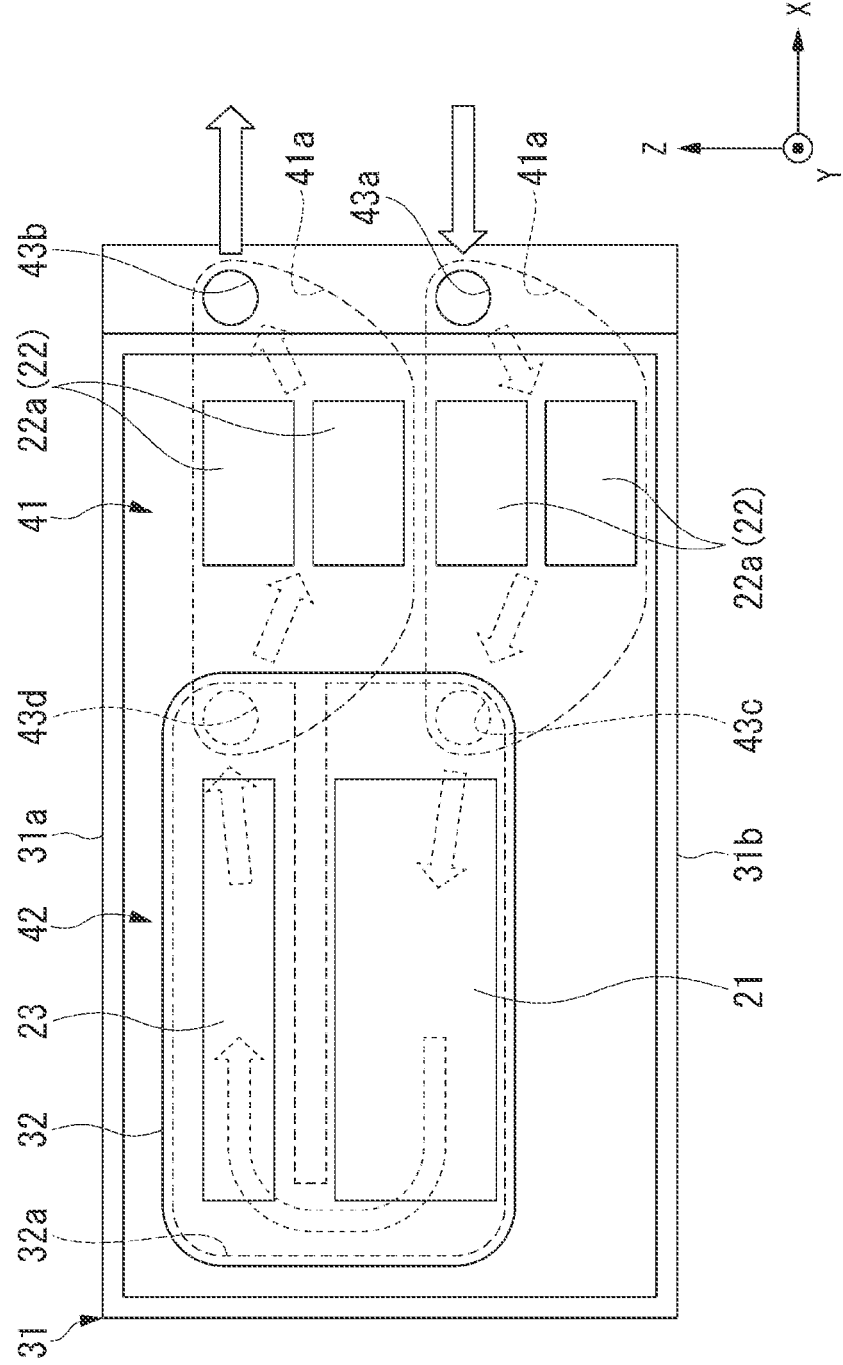
FIG. 4 is a view showing a refrigerant flow path of the electric power conversion device of the embodiment.
Figure 5:
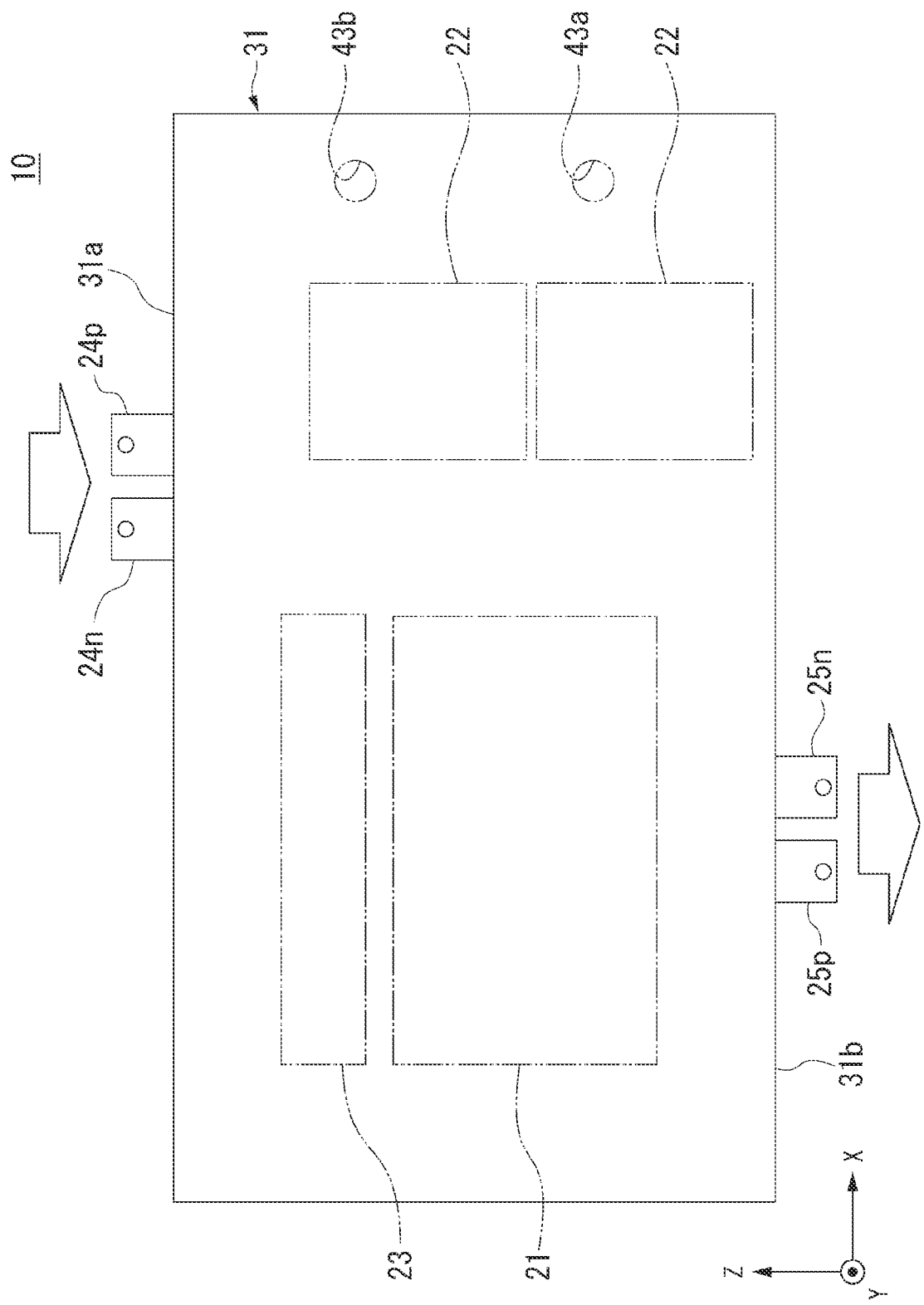
FIG. 5 is a view of the electric power conversion device of the embodiment when seen from a Y direction.
Figure 6:
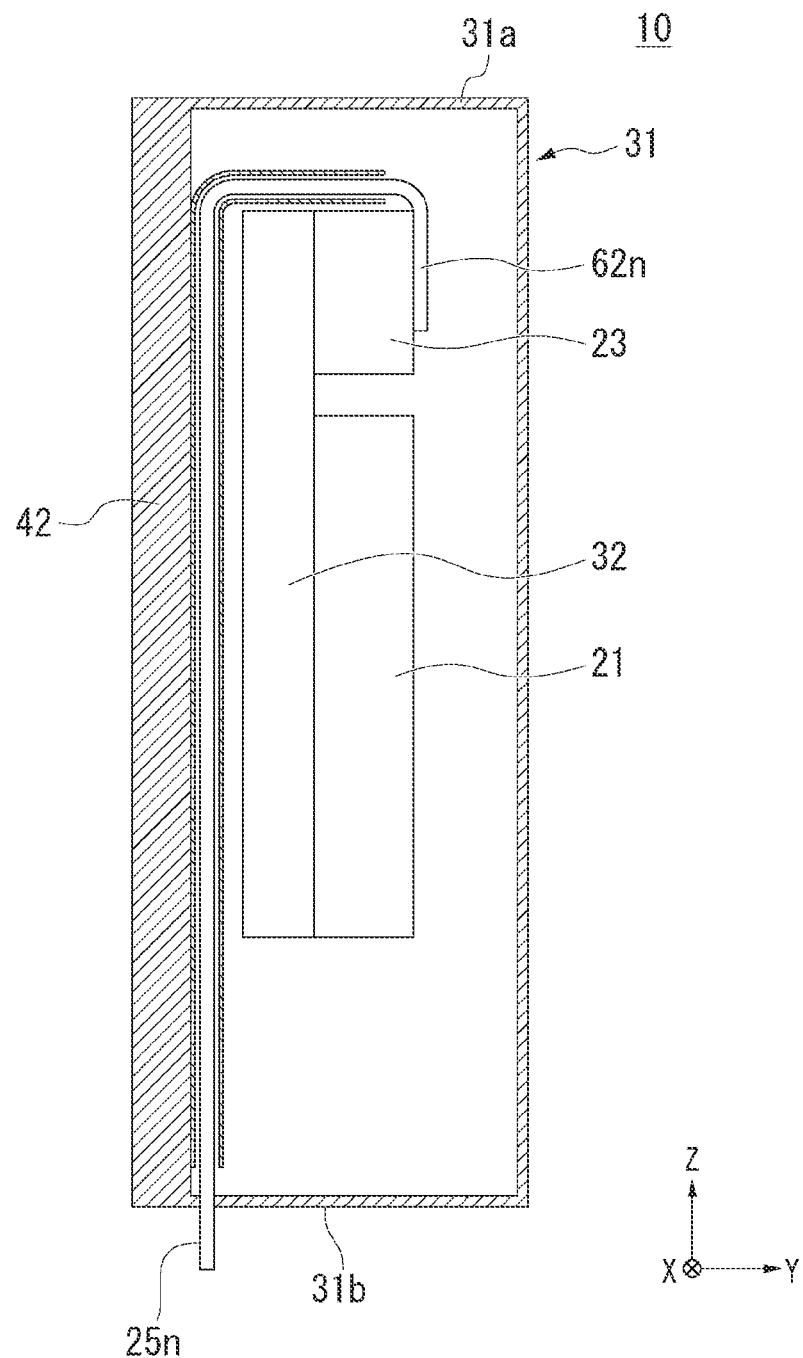
FIG. 6 is a cross-sectional view of the electric power conversion device of the embodiment when seen from an X direction.
Figure 7:
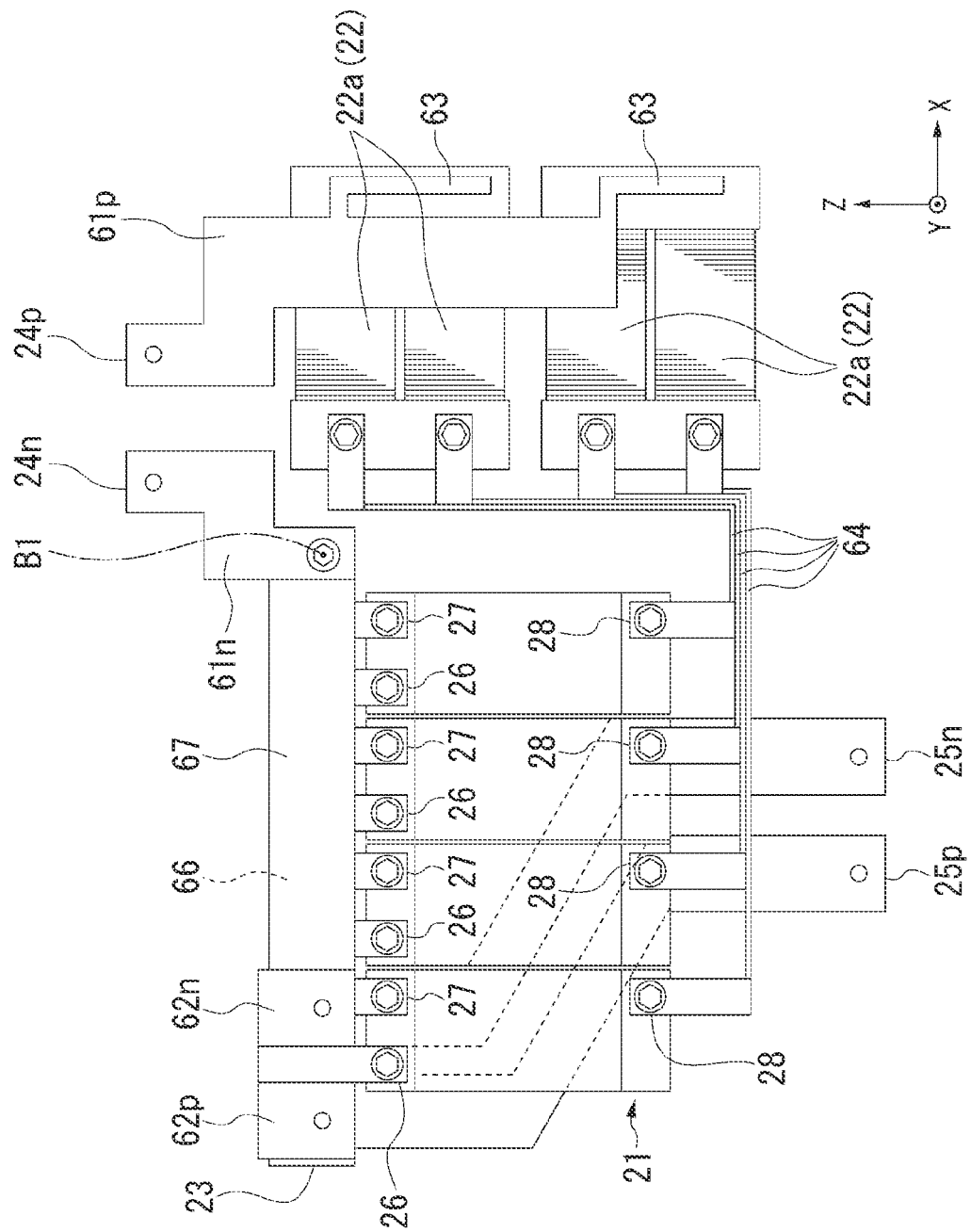
FIG. 7 is a view showing a state in which a case or the like is removed in FIG. 5.
Figure 8:
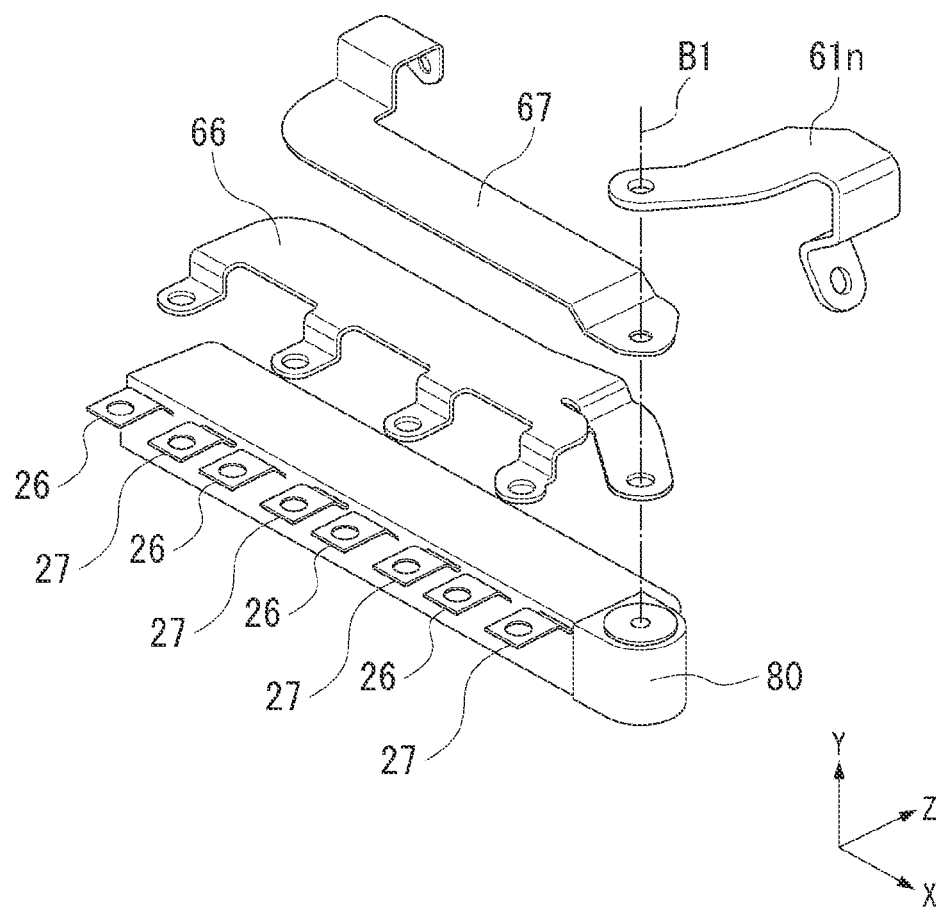
FIG. 8 is an exploded perspective view of a first conductive member, a second conductive member, and a third conductive member of the embodiment.

FIG. 3 is an exploded perspective view of the electric power conversion device of the embodiment. FIG. 4 is a view showing a refrigerant flow path of the electric power conversion device of the embodiment. FIG. 5 is a view of the electric power conversion device of the embodiment when seen from a Y direction. FIG. 6 is a cross-sectional view of the electric power conversion device of the embodiment when seen from an X direction. FIG. 7 is a view showing a state in which a case or the like is removed in FIG. 5. FIG. 8 is an exploded perspective view of a first conductive member, a second conductive member, and a third conductive member of the embodiment. In the following description, X-axis, Y-axis, and Z-axis directions orthogonal to each other in a three-dimensional space are directions parallel to the axes of the vehicle 1. For example, the Z direction is parallel to an upward-downward direction of the vehicle 1, the Y direction is parallel to a thickness direction of the electric power conversion device 10, and the X direction is orthogonal to the Z direction and the Y direction. For example, a +Z side is an upper side in the vertical direction at the time of mounting on the vehicle.

As shown in FIG. 3 and FIG. 4, the electric power conversion device 10 includes the converter 15, the electronic control unit 17, the gate drive unit 18, a case 31, a cooler 32, and a support member 33.

An outer shape of the case 31 is a rectangular box shape having a bottom portion at an end portion in the Y direction. A bottom portion of the case 31 includes a cooling portion 41 on which the two composite reactors 22 of the converter 15 are arranged, and a support portion 42 that supports the cooler 32 connected to the cooling portion 41. The cooling portion 41 and the support portion 42 are provided side-by-side in the X direction.

A supply port 43a and a discharge port 43b of a refrigerant are formed on an end portion of the case 31 on the side of the cooling portion 41 in the X direction. The supply port 43a and the discharge port 43b are formed so as to be aligned and spaced apart from each other in the Z direction. In the bottom portion of the case 31, the thickness of the cooling portion 41 in the Y direction is formed to be larger than the thickness of the support portion 42 in the Y direction. Two refrigerant flow paths 41a through which the refrigerant flows by communicating with the cooler 32 and each of the supply port 43a and the discharge port 43b are formed inside the cooling portion 41. The two refrigerant flow paths 41a are formed so as to be aligned and spaced apart from each other in the Z direction.

Two connection ports 43c, 43d that communicate with the cooler 32 and each of the two refrigerant flow paths 41a are formed on an end of the cooling portion 41 on the side of the support portion 42 in the X direction. The two connection ports 43c, 43d are a connection port 43c on the supply side of the refrigerant and a connection port 43d on the discharge side of the refrigerant, and are formed so as to be aligned and spaced apart from each other in the Z direction.

The two composite reactors 22 of the converter 15 are arranged on a surface of the cooling portion 41. For example, the two composite reactors 22 are arranged to be aligned and spaced apart from each other in the Z direction so as to face the two refrigerant flow paths 41a in the Y direction. The two-phase coils 22a of each composite reactor 22 are arranged to be aligned and spaced apart from each other in the Z direction so as to face each refrigerant flow path 41a in the Y direction.

An outer shape of the cooler 32 is a rectangular plate shape of which a thickness direction is set in the Y direction. For example, the cooler 32 is a water jacket. The cooler 32 is arranged to be spaced apart from a surface of the support portion 42 of the case 31 in the Y direction. The cooler 32 is connected to the cooling portion 41 of the case 31. A refrigerant flow path 32a that communicates with the two connection ports 43c, 43d of the cooling portion 41 of the case 31 is formed inside the cooler 32. An outer shape of the refrigerant flow path 32a when seen from the Y direction is a U shape. The shape of the refrigerant flow path 32a is a shape that extends from the refrigerant supply side connection port 43c on the first end side in the X direction toward the second end side in the X direction, curves so as to be folded back at the second end side in the X direction, and extends toward the refrigerant discharge side connection port 43d on the first end side.

The cooler 32 has a first surface 32A on an opposite side with respect to the support portion 42 side of the case 31 of both surfaces in the Z direction. The element module 21 and the condenser 23 of the converter 15 are arranged on the first surface 32A of the cooler 32 so as to be aligned and spaced apart from each other in the Z direction. The condenser 23 is arranged on the side of a first end portion 31a of both ends of the case 31 in the Z direction.

The element module 21 is arranged on a side of a second end portion 31b of both ends of the case 31 in the Z direction. In plan view seen from the Y direction, the condenser 23 is arranged on the side of the first end portion 31a in the Z direction with respect to the element module 21.

The element module 21 is arranged so as to face the supply side of the refrigerant flow path 32a in the Y direction. The element module 21 is arranged so as to overlap a portion that extends from the refrigerant supply side connection port 43c on the first end side in the X direction of the refrigerant flow path 32a toward the second end side in the X direction in plan view seen from the Y direction. The four phases of the element module 21 are arranged so as to be aligned and spaced apart from each other in the X direction.

The condenser 23 is arranged so as to face the discharge side of the refrigerant flow path 32a in the Y direction. The condenser 23 is arranged so as to overlap a portion that extends from the second end side in the X direction of the refrigerant flow path 32a toward the refrigerant discharge side connection port 43d on the first end side in plan view seen from the Y direction. A positive electrode terminal and a negative electrode terminal of the condenser 23 are arranged so as to be aligned and spaced apart from each other in the X direction.

In plan view seen from the Y direction, a flow direction of the refrigerant that flows through the refrigerant flow path 32a of the cooler 32 has a direction (for example, the X direction) that intersects an alignment direction (for example, the Z direction) of the element module 21 and the condenser 23.

As shown in FIG. 4, in the cooling portion 41 and the cooler 32 of the case 31, first, the refrigerant that flows from the supply port 43a of the case 31 through the refrigerant flow path 41a cools the composite reactor 22 arranged on the supply side in Z direction among the two composite reactors 22. Next, the refrigerant that flows from the supply side connection port 43c of the case 31 through the supply side of the refrigerant flow path 32a of the cooler 32 cools the element module 21 of the converter 15. Next, the refrigerant that flows through the discharge side of the refrigerant flow path 32a of the cooler 32 cools the condenser 23 of the converter 15. Next, the refrigerant that flows from the discharge side connection port 43d of the case 31 through the refrigerant flow path 41a cools the composite reactor 22 arranged on the discharge side in the Z direction among the two composite reactors 22. Then, the refrigerant in the refrigerant flow path 32a is discharged to the outside from the discharge port 43b of the case 31.

As shown in FIG. 3, an outer shape of the support member 33 is a rectangular plate shape of which a thickness direction is set in the Y direction. The support member 33 supports a substrate on which the electronic control unit 17 and the gate drive unit 18 are arranged. For example, the substrate is fixed to the support member 33 by a fastening member such as a stepped screw so as to be stacked and spaced apart from the support member 33 in the Y direction.

The support member 33 is fixed to the support portion 42. For example, the support member 33 is fastened to the support portion 42 by a fastening member such as a bolt and a joint member (for example, an extension joint, a thread conversion joint in which male and female threads are formed on both ends in an axial direction, or the like).

As shown in FIG. 2 and FIG. 3, the electric power conversion device 10 includes the primary side positive electrode bus bar 61p, the primary side negative electrode bus bar 61n, the secondary side positive electrode bus bar 62p, the secondary side negative electrode bus bar 62n, two first bus bars 63, four second bus bars 64, the positive electrode bus bar 65, and the negative electrode bus bars 66, 67. For example, each of the bus bars 61p, 61n, 62p, 62n, 63, 64, 65, 66, and 67 is a conductive plate member such as a copper plate.

The primary side positive electrode bus bar 61p is connected to the primary side positive electrode terminal 24p and the two first bus bars 63. The primary side negative electrode bus bar 61n is connected to the primary side negative electrode terminal 24n and the negative electrode bus bars 66, 67. The primary side positive electrode terminal 24p connected to the primary side positive electrode bus bar 61p and the primary side negative electrode terminal 24n connected to the primary side negative electrode bus bar 61n are arranged on the first end portion 31a of both ends of the case 31 in the Z direction. The primary side positive electrode terminal 24p and the primary side negative electrode terminal 24n are arranged on a vehicle upper side (upper side in the vertical direction) in an on-vehicle state of the electric power conversion device 10.

The primary side positive electrode bus bar 61p is arranged to be spaced apart in the Y direction from the two composite reactors 22. The primary side negative electrode bus bar 61n is arranged between the support member 33 and the condenser 23 of the converter 15 in the Y direction.

The secondary side positive electrode bus bar 62p is connected to the secondary side positive electrode terminal 25p and the positive electrode bus bar 65. The secondary side negative electrode bus bar 62n is connected to the secondary side negative electrode terminal 25n and the negative electrode bus bar 67. The secondary side positive electrode terminal 25p connected to the secondary side positive electrode bus bar 62p and the secondary side negative electrode terminal 25n connected to the secondary side negative electrode bus bar 62n are arranged, for example, on the second end portion 31b of both ends of the case 31 in the Z direction. The secondary side positive electrode terminal 25p and the secondary side negative electrode terminal 25n are arranged on a vehicle lower side (lower side in the vertical direction) in an on-vehicle state of the electric power conversion device 10.

The secondary side positive electrode bus bar 62p and the secondary side negative electrode bus bar 62n are arranged, for example, between the support portion 42 of the case 31 and the cooler 32 in the Y direction. The cooler 32 has a second surface 32B on the support portion 42 side of the case 31 of both surfaces in the Z direction. The secondary side positive electrode bus bar 62p and the secondary side negative electrode bus bar 62n are arranged along each of the second surface 32B of the cooler 32 and the surface 42A of the support portion 42. The secondary side positive electrode bus bar 62p and the secondary side negative electrode bus bar 62n are arranged so as to extend from the first end portion 31a side toward the secondary side positive electrode terminal 25p and the secondary side negative electrode terminal 25n at the second end portion 31b between the first end portion 31a and the second end portion 31b of the case 31 in the Z direction. The secondary side positive electrode bus bar 62p and the secondary side negative electrode bus bar 62n extend toward the condenser 23 of the converter 15 so as to bend in the Y direction at the first end portion 31a side. The secondary side positive electrode bus bar 62p and the secondary side negative electrode bus bar 62n are arranged so as to extend in parallel and not to overlap each other in plan view seen from the Y direction. For example, each of the secondary side positive electrode bus bar 62p and the secondary side negative electrode bus bar 62n includes an insulation film that has an electrical insulation property and covers the surface.

The two first bus bars 63 are connected to the primary side positive electrode bus bar 61p and the two composite reactors 22.

The four second bus bars 64 are connected to four coils 22a and four third terminals 28 of the two composite reactors 22.

The positive electrode bus bar 65 is connected to the four-phase first terminal 26, the positive electrode terminal of the condenser 23, and the secondary side positive electrode bus bar 62p. The negative electrode bus bar 66 is connected to the four-phase second terminal 27 and the negative electrode terminal of the condenser 23. The negative electrode bus bar 67 is connected to the negative electrode terminal of the condenser 23 and the secondary side negative electrode bus bar 62n. The positive electrode bus bar 65 and the negative electrode bus bars 66, 67 are arranged so as to be stacked on the condenser 23 in the Y direction and extend along the surface of the condenser 23 in the X direction.

For example, among the positive electrode bus bar 65 and the negative electrode bus bar 66, at least the positive electrode bus bar 65 sandwiched by the negative electrode bus bar 66 and the condenser 23 in the Y direction includes an insulation film that has an electrical insulation property and covers the surface.

<Conductive Member>

Each of the primary side negative electrode bus bar 61$n$, the negative electrode bus bar 66, and the negative electrode bus bar 67 described above is a conductive member as a separate body. Hereinafter, the primary side negative electrode bus bar 61$n$ is also referred to as a "first conductive member 61$n$", the negative electrode bus bar 66 is also referred to as a "second conductive member 66", and the negative electrode bus bar 67 is also referred to as a "third conductive member 67".

As shown in FIG. 3 and FIG. 8, the first conductive member 61$n$, the second conductive member 66, and the third conductive member 67 are connected to each other. The first conductive member 61$n$, the second conductive member 66, and the third conductive member 67 are fixed to a terminal base 80 by a fastening member such as a bolt. The first conductive member 61$n$ is formed as a separate body separately from the second conductive member 66 and the third conductive member 67. The second conductive member 66 and the third conductive member 67 are formed as separate bodies from each other. That is, the first conductive member 61$n$, the second conductive member 66, and the third conductive member 67 are formed as separate bodies from each other.

The first conductive member 61$n$ extends in the +Y direction from a portion connected to the primary side negative electrode terminal 24$n$, then extends in the −X direction and the −Z direction, and is thereby connected to the terminal base 80. The first conductive member 61$n$ has a through-hole through which a bolt can be inserted at a portion connected to the primary side negative electrode terminal 24$n$ and at a portion connected to the terminal base 80. The first conductive member 61$n$ is connected to the primary side negative electrode terminal 24$n$ and the terminal base 80 by the bolt being inserted through each through-hole.

The second conductive member 66 extends along the X direction so as to span four portions connected to the four-phase second terminals 27 (the negative electrode terminal of the switching element) and is connected to the terminal base 80 at a portion on the +X direction end side. The second conductive member 66 has a through-hole through which a bolt can be inserted at four portions connected to the four-phase second terminals 27 and at a portion connected to the terminal base 80. The second conductive member 66 is connected to the four-phase second terminals 27 and the terminal base 80 by the bolt being inserted through each through-hole.

The cross-sectional area perpendicular to the current path direction of the second conductive member 66 is smaller than the cross-sectional area perpendicular to the current path direction of the first conductive member 61$n$. That is, the plate thickness of the second conductive member 66 is smaller than the plate thickness of the first conductive member 61$n$.

The third conductive member 67 extends in the −Z direction from a portion connected to the secondary side negative electrode bus bar 62$n$ (secondary side negative electrode terminal 25$n$ side), then extends in the +X direction, and is thereby connected to the terminal base 80.

The third conductive member 67 has a through-hole through which a bolt can be inserted at a portion connected to the secondary side negative electrode terminal 25$n$ side and at a portion connected to the terminal base 80. The third conductive member 67 is connected to the secondary side negative electrode terminal 25$n$ side and the terminal base 80 by the bolt being inserted through each through-hole.

The cross-sectional area perpendicular to the current path direction of the third conductive member 67 is smaller than the cross-sectional area perpendicular to the current path direction of the first conductive member 61$n$. That is, the plate thickness of the third conductive member 67 is smaller than the plate thickness of the first conductive member 61$n$. For example, the plate thickness of the third conductive member 67 may be the same as the plate thickness of the second conductive member 66.

The terminal base 80 has a female thread to which a bolt can be screwed. For example, the second conductive member 66, the third conductive member 67, and the first conductive member 61$n$ are arranged in this order with respect to the terminal base 80. In this state, the bolt is screwed through the through-holes of the conductive members to the female thread. Thereby, the first conductive member 61$n$, the second conductive member 66, and the third conductive member 67 can be fastened by the bolt to the terminal base 80. That is, the first conductive member 61$n$, the second conductive member 66, and the third conductive member 67 are fastened together to the terminal base 80.

A portion at which the first conductive member 61$n$ is connected to the second conductive member 66 and the third conductive member 67 is arranged closer to the primary side negative electrode terminal 24$n$ than the secondary side negative electrode terminal 25$n$. The portion at which the first conductive member 61$n$ is connected to the second conductive member 66 and the third conductive member 67 corresponds to a portion at which the bolt is fastened to the terminal base 80. Hereinafter, a center point (a center position B1 shown in FIG. 8) of the portion at which the bolt is fastened to the terminal base 80 is also referred to as a "bolt fastening point". When seen from the Y direction, the bolt fastening point B1 is arranged closer to the primary side negative electrode terminal 24$n$ than the secondary side negative electrode terminal 25$n$.

Part of the first conductive member 61$n$, the second conductive member 66, and the third conductive member 67 intersect on planes different from each other. Portions of the first conductive member 61$n$, the second conductive member 66, and the third conductive member 67 connected to the terminal base 80 are arranged on different planes from each other parallel to the XZ plane. A portion of the second conductive member 66 that extends in the −X direction from the portion connected to the terminal base 80 is arranged on a further −Y side than a portion of the third conductive member 67 that extends the −X direction from the portion connected to the terminal base 80.

<Action by Bolt Fastening Point>

Figure 9:
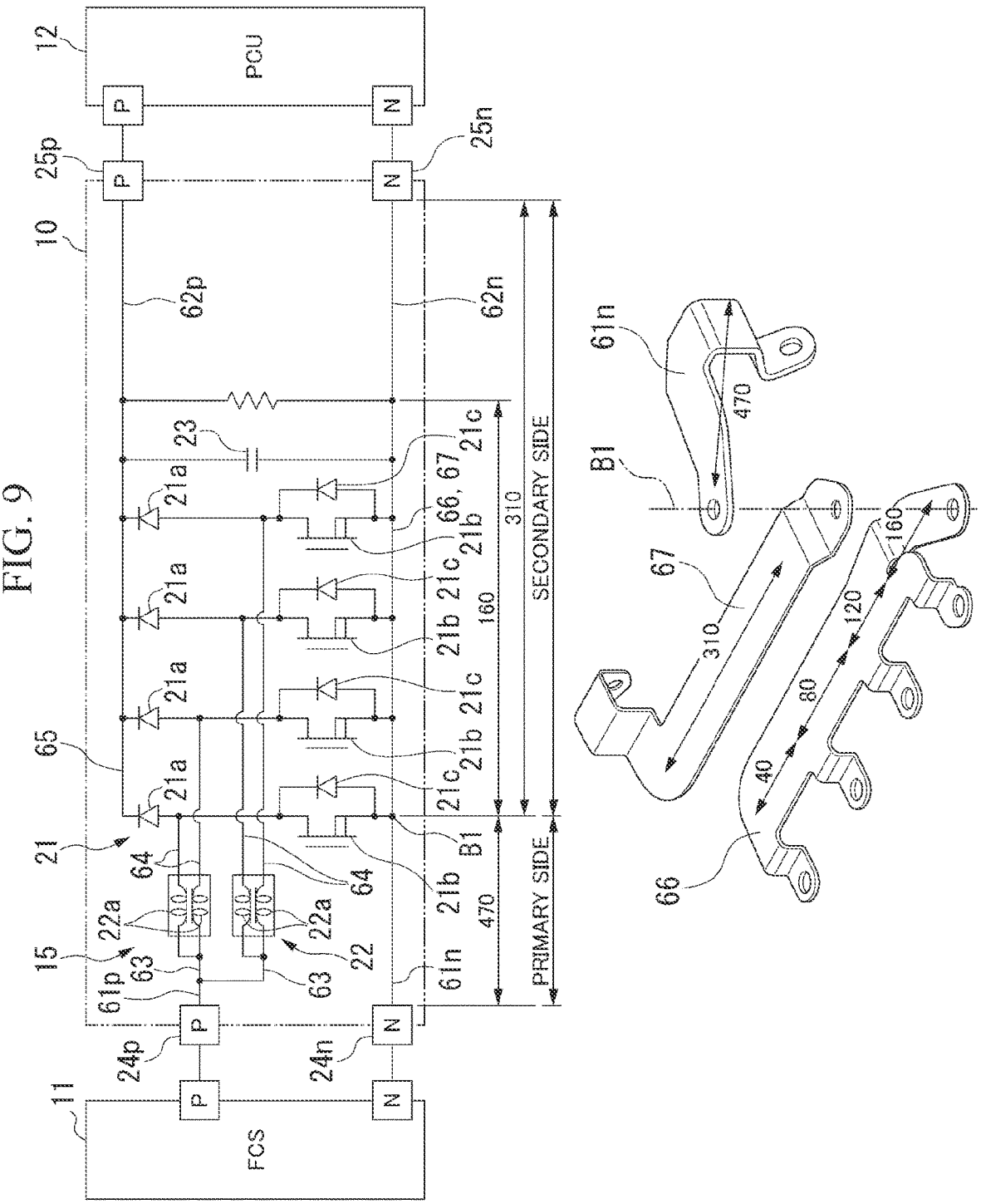
FIG. 9 is an action explanation view by a bolt fastening point of the embodiment.
Figure 10:
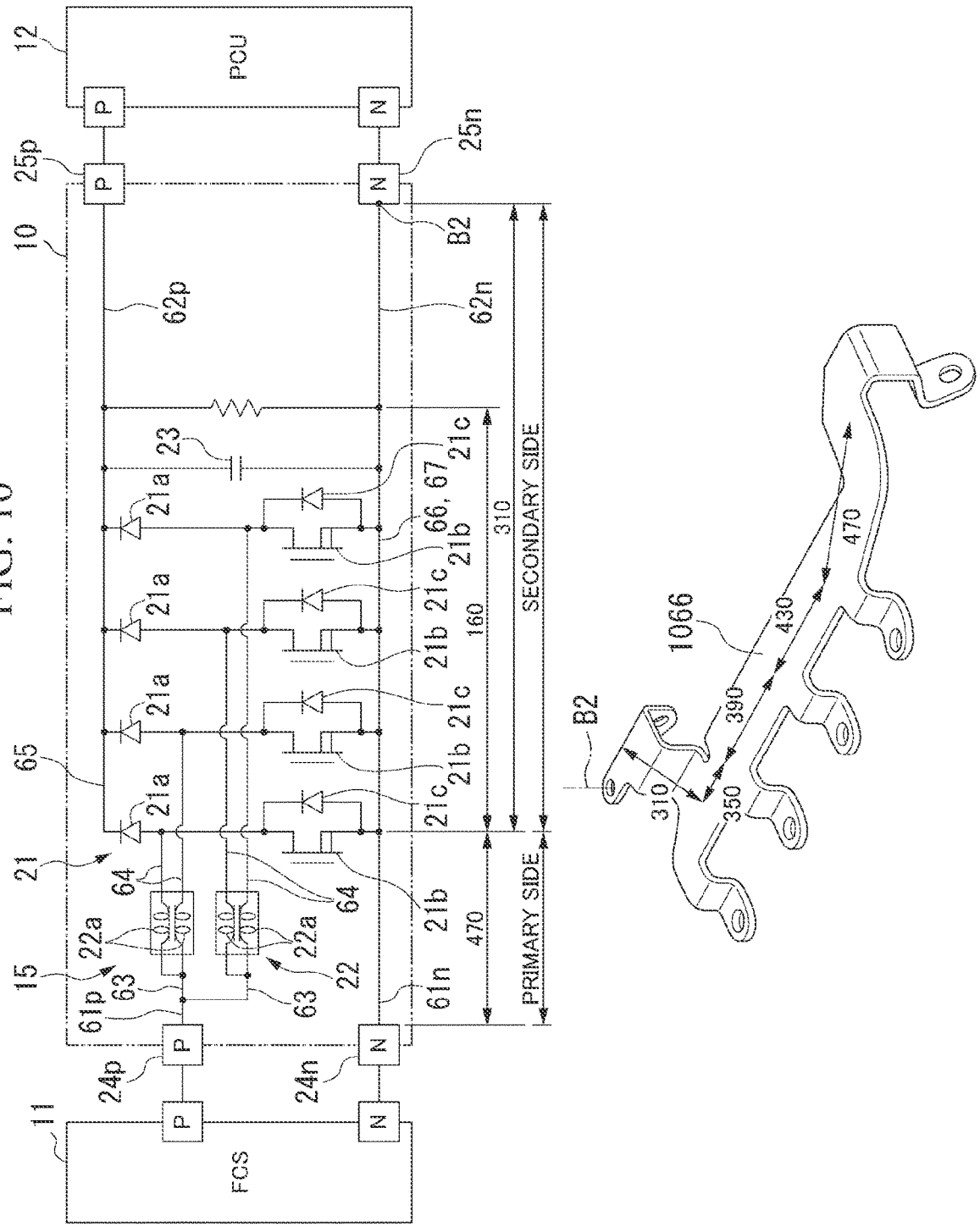
FIG. 10 is an action explanation view by a bolt fastening point of a comparative example.

FIG. 9 is an action explanation view by a bolt fastening point of the embodiment. FIG. 10 is an action explanation view by a bolt fastening point of a comparative example.

As shown in FIG. 10, a conductive member 1066 of the comparative example has a branched shape for connecting the primary side negative electrode terminal 24$n$ to the secondary side negative electrode terminal 25$n$ and the negative electrode terminal of the switching element. Since a FC converter uses a large amount of electric power, a large current (for example, 300 to 500 amperes) flows through a conductive member connected to the primary side negative electrode terminal 24n. In the comparative example, a bolt fastening point B2 is arranged closer to the secondary side negative electrode terminal 25n than the primary side negative electrode terminal 24n. In the comparative example, the line length of the primary side bus bar is longer than the line length of the secondary side bus bar. In the comparative example, since the line length of a line through which the largest current (a primary side current) flows in the electric power conversion device is long, there is a high probability of the increase in loss.

As shown in FIG. 9, the conductive member 61n, 66, 67 of the embodiment is divided into three parts.

The first conductive member 61n, the second conductive member 66, and the third conductive member 67 are formed as separate bodies from each other. The bolt fastening point B1 of the embodiment is arranged closer to the primary side negative electrode terminal 24n than the secondary side negative electrode terminal 25n.

A current of, for example, 40 amperes per phase flows through a portion of the second conductive member 66 connected to the switching element. Therefore, a current of, for example, up to 160 amperes that is increased by each phase flows through the second conductive member 66. A current of, for example, 310 amperes flows through a portion of the third conductive member 67 to which the current returns by the portion being fed to a load side. A current of a total value (for example, 470 amperes) of combined currents that flow through the second conductive member 66 and the third conductive member 67 flows through the first conductive member 61n. In the embodiment, since the line length of a line through which the largest current (a primary side current) flows in the electric power conversion device is shorter than that of the comparative example, there is a low probability of the increase in loss.

Action and Effects

As described above, the electric power conversion device 10 of the above embodiment includes: the primary side negative electrode terminal 24n; the secondary side negative electrode terminal 25n; the negative electrode terminal 27 of the switching element connected between the primary side negative electrode terminal 24n and the secondary side negative electrode terminal 25n; the first conductive member 61n connected to the primary side negative electrode terminal 24n; the second conductive member 66 connected to the negative electrode terminal 27 of the switching element; and the third conductive member 67 connected to the secondary side negative electrode terminal 25n, wherein the first conductive member 61n, the second conductive member 66, and the third conductive member 67 are connected to one another, and the first conductive member 61n is formed as a separate body separately from the second conductive member 66 and the third conductive member 67.

According to this configuration, the first conductive member 61n is formed as a separate body separately from the second conductive member 66 and the third conductive member 67, and thereby, it is possible to shorten the line length of the first conductive member 61n regardless of the line lengths of the second conductive member 66 and the third conductive member 67. Therefore, it is possible to shorten the line length of a line through which the largest current (a primary side current) flows in the electric power conversion device 10. Accordingly, it is possible to prevent the increase in loss. Additionally, cooling can be facilitated compared to the case in which the first conductive member 61n is formed integrally with the second conductive member 66 and the third conductive member 67.

In the embodiment described above, the second conductive member 66 and the third conductive member 67 are formed as separate bodies from each other.

According to this configuration, cooling can be facilitated compared to the case in which the second conductive member 66 and the third conductive member 67 are formed integrally with each other.

In the embodiment described above, the cross-sectional area perpendicular to the current path direction of the second conductive member 66 is smaller than the cross-sectional area perpendicular to the current path direction of the first conductive member 61n.

According to this configuration, by thinning the second conductive member 66 more than the first conductive member 61n, the weight can be reduced.

In the embodiment described above, the cross-sectional area perpendicular to the current path direction of the third conductive member 67 is smaller than the cross-sectional area perpendicular to the current path direction of the first conductive member 61n.

According to this configuration, by thinning the third conductive member 67 more than the first conductive member 61n, the weight can be reduced.

In the embodiment described above, the portion at which the first conductive member 61n is connected to the second conductive member 66 and the third conductive member 67 is arranged closer to the primary side negative electrode terminal 24n than the secondary side negative electrode terminal 25n.

According to this configuration, compared to the case where the portion at which the first conductive member 61n is connected to the second conductive member 66 and the third conductive member 67 is arranged closer to the secondary side negative electrode terminal 25n than the primary side negative electrode terminal 24n, it is possible to shorten the line length of a line through which a large current (a primary side current) flows in the first conductive member 61n. Accordingly, it is possible to prevent the increase in loss.

In the embodiment described above, at least part of the first conductive member 61n, the second conductive member 66, and the third conductive member 67 intersect on planes different from each other.

According to this configuration, since at least part of the first conductive member 61n, the second conductive member 66, and the third conductive member 67 spatially intersect one another and are thereby arranged compactly, miniaturization can be achieved.

Modification Example

The above embodiment has been described using an example in which the second conductive member and the third conductive member are formed as separate bodies from each other; however, the embodiment is not limited thereto. For example, the second conductive member and the third conductive member may be formed integrally with each other. For example, the form of the second conductive member and the third conductive member can be changed in accordance with requirement specifications.

The above embodiment has been described using an example in which the cross-sectional area perpendicular to the current path direction of the second conductive member is smaller than the cross-sectional area perpendicular to the current path direction of the first conductive member; however, the embodiment is not limited thereto. For example, the cross-sectional area perpendicular to the current path direction of the second conductive member may be equal to or larger than the cross-sectional area perpendicular to the current path direction of the first conductive member. For example, the relationship between the cross-sectional areas perpendicular to the current path directions of the first conductive member and the second conductive member can be changed in accordance with required specifications.

The above embodiment has been described using an example in which the cross-sectional area perpendicular to the current path direction of the third conductive member is smaller than the cross-sectional area perpendicular to the current path direction of the first conductive member; however, the embodiment is not limited thereto. For example, the cross-sectional area perpendicular to the current path direction of the third conductive member may be equal to or larger than the cross-sectional area perpendicular to the current path direction of the first conductive member. For example, the relationship between the cross-sectional areas perpendicular to the current path directions of the first conductive member and the third conductive member can be changed in accordance with required specifications.

The above embodiment has been described using an example in which the portion at which the first conductive member is connected to the second conductive member and the third conductive member is arranged closer to the primary side negative electrode terminal than the secondary side negative electrode terminal; however, the embodiment is not limited thereto. For example, the portion at which the first conductive member is connected to the second conductive member and the third conductive member may be arranged closer to the secondary side negative electrode terminal than the primary side negative electrode terminal.

For example, the arrangement of the portion at which the first conductive member is connected to at least one of the second conductive member and the third conductive member can be changed in accordance with requirement specifications.

The above embodiment has been described using an example in which at least part of the first conductive member, the second conductive member, and the third conductive member intersect on planes different from each other; however, the embodiment is not limited thereto. For example, the first conductive member, the second conductive member, and the third conductive member may not intersect on planes different from each other. For example, the arrangement of the first conductive member, the second conductive member, and the third conductive member can be changed in accordance with requirement specifications.

Although preferred embodiments of the present invention have been described above, the present invention is not limited thereto. Additions, omissions, substitutions, and other modifications of the configuration can be made without departing from the scope of the present invention, and the above-described modifications can be suitably combined. These embodiments and modifications thereof are included in the scope and the gist of the invention and are also included in the scope of the invention described in the appended claims and equivalence thereof.

What is claimed is:

1. An electric power conversion device, comprising:
    a primary side negative electrode terminal;
    a secondary side negative electrode terminal;
    a negative electrode terminal of a switching element connected between the primary side negative electrode terminal and the secondary side negative electrode terminal;
    a first conductive member connected to the primary side negative electrode terminal;
    a second conductive member connected to the negative electrode terminal of the switching element; and
    a third conductive member connected to the secondary side negative electrode terminal,
    wherein the first conductive member, the second conductive member, and the third conductive member are connected to one another, and
    the first conductive member is formed as a separate body separately from the second conductive member and the third conductive member.

2. The electric power conversion device according to claim 1,
    wherein the second conductive member and the third conductive member are formed as a separate body separately from each other.

3. The electric power conversion device according to claim 1,
    wherein a cross-sectional area perpendicular to a current path direction of the second conductive member is smaller than a cross-sectional area perpendicular to a current path direction of the first conductive member.

4. The electric power conversion device according to claim 2,
    wherein a cross-sectional area perpendicular to a current path direction of the second conductive member is smaller than a cross-sectional area perpendicular to a current path direction of the first conductive member.

5. The electric power conversion device according to claim 1,
    wherein a cross-sectional area perpendicular to a current path direction of the third conductive member is smaller than a cross-sectional area perpendicular to a current path direction of the first conductive member.

6. The electric power conversion device according to claim 4,
    wherein a cross-sectional area perpendicular to a current path direction of the third conductive member is smaller than a cross-sectional area perpendicular to a current path direction of the first conductive member.

7. The electric power conversion device according to claim 1,
    wherein a portion at which the first conductive member is connected to at least one of the second conductive member and the third conductive member is arranged closer to the primary side negative electrode terminal than the secondary side negative electrode terminal.

8. The electric power conversion device according to claim 6,
    wherein a portion at which the first conductive member is connected to at least one of the second conductive member and the third conductive member is arranged closer to the primary side negative electrode terminal than the secondary side negative electrode terminal.

9. The electric power conversion device according to claim 1,
    wherein at least part of the first conductive member, the second conductive member, and the third conductive member intersect on planes different from each other.

* * * * *